United States Patent [19]

Zaugg

[11] 4,270,342
[45] Jun. 2, 1981

[54] METHOD OF OPERATING A GAS TURBINE PLANT

[75] Inventor: Paul Zaugg, Baden, Switzerland

[73] Assignee: BBC Brown, Boveri & Co. Ltd., Baden, Switzerland

[21] Appl. No.: 9,531

[22] Filed: Feb. 5, 1979

[30] Foreign Application Priority Data

Jun. 16, 1978 [CH] Switzerland .................. 6573/78

[51] Int. Cl.³ .............................................. F02C 6/00
[52] U.S. Cl. ................................ 60/39.04; 60/39.17
[58] Field of Search ............ 60/39.04, 39.17, 39.51 R

[56] References Cited

U.S. PATENT DOCUMENTS

| | | | |
|---|---|---|---|
| 2,242,767 | 5/1941 | Traupel | 60/39.17 |
| 2,407,166 | 9/1946 | Kreitner et al. | 60/39.04 |
| 2,584,232 | 2/1952 | Sedille | 60/39.17 |
| 2,633,707 | 4/1953 | Hermitte et al. | 60/39.17 |
| 3,054,257 | 9/1962 | Schelp | 60/39.17 |
| 3,315,467 | 4/1967 | DeWitt | 60/39.17 |
| 4,173,121 | 11/1979 | Yu | 60/39.17 |

Primary Examiner—Louis J. Casaregola
Attorney, Agent, or Firm—Werner W. Kleeman

[57] ABSTRACT

A method of operating a gas turbine plant which, at the side of the turbine, has a high pressure section and a low pressure section, each of which has connected forwardly thereof a respective combustion chamber and wherein the combustion air is pre-heated. The combustion air, prior to entry into the high pressure-combustion chamber, is initially heated in a pre-heater and thereafter flushes the inner wall of the housing of the high pressure section and thus heats the same. The outlet temperature from the high pressure section is chosen such that it corresponds essentially to the inlet temperature at the housing of the high pressure section. Furthermore, the outlet temperature of the combustion air from the pre-heater is maintained constant, independent of load changes.

2 Claims, 2 Drawing Figures

METHOD OF OPERATING A GAS TURBINE PLANT

BACKGROUND OF THE INVENTION

The present invention relates to a new and improved method of operating a gas turbine plant or installation which, at the side of the turbine, has a high pressure section and a low pressure section, each of which has connected forwardly thereof a respective combustion chamber and wherein the combustion air is pre-heated.

In the case of gas tubines having a high pressure section and a low pressure section and working with high inlet pressures, as for instance arise in the case of installations having air storages, in most instances these gas turbines are designed such that the high pressure section and the low pressure section are arranged in the same turbine housing. Significant in this regard are the publications entitled, BBC Mitteilungen No. 1/77 and Sonderdruck CH-T 113 133 D.

With these known system designs there arises, however, the problem that generally the housing temperature of the housing portion surrounding the high pressure turbine, both during full load and also during partial load operation have a temperature deviating from the low pressure-housing portion or section. Consequently, thermal stresses arise in the total housing of the turbine system.

SUMMARY OF THE INVENTION

It is a primary object of the present invention to provide a new and improved method of operating a gas turbine plant wherein the aforementioned drawbacks, during operation of such gas turbine plant, do not arise, and furthermore, both housing portions or sections always have the same temperature independent of the load, thereby precluding the occurrence of any or any appreciable thermal stresses in the housing.

Yet a further significant object of the present invention aims at a novel method of operating a gas turbine installation of the type comprising a high pressure section and a low pressure section, in a manner avoiding the occurrence of undesirable thermal stresses at the turbine housing.

Now in order to implement these and still further objects of the invention, which will become more readily apparent as the description proceeds, the method aspects of the present invention contemplate initially heating the combustion air in a pre-heater, prior to its entry into the high pressure-combustion chamber, then flushing by means of such pre-heated combustion air the inner walls of the high pressure housing, and thus, heating the same. The outlet temperature from the high pressure section is chosen such that it essentially corresponds to the inlet temperature of the combustion air into the high pressure housing. Furthermore, independent of load changes, the outlet temperature of the combustion air from the pre-heater is maintained essentially constant.

Furthermore, it is advantageous to regulate the load changes of the gas turbine predominantly by means of the quantity of combustion air.

BRIEF DESCRIPTION OF THE DRAWINGS

The invention will be better understood and objects other than those set forth above, will become apparent when consideration is given to the following detailed description. Such description makes reference to the annexed drawings wherein.

DETAILED DESCRIPTION OF THE PREFERRED EMBODIMENTS

Figure 1:
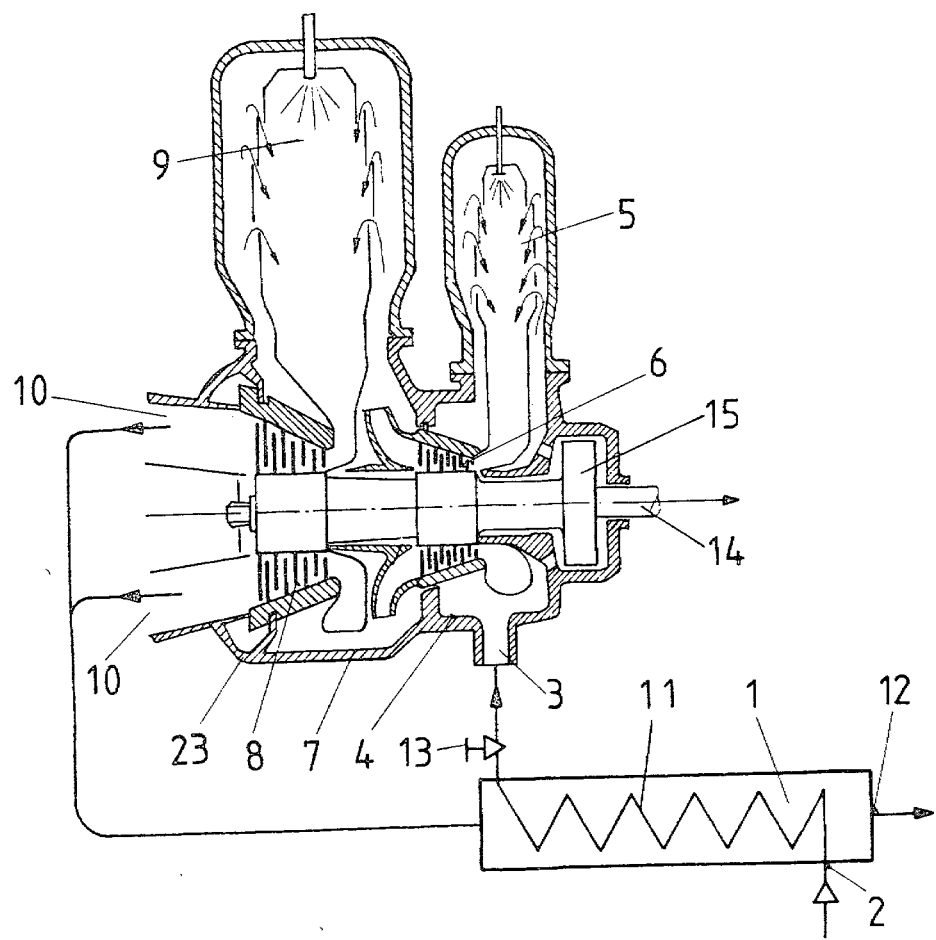
FIG. 1 is a longitudinal sectional view through a gas turbine plant or installation equipped with a pre-heater and operated according to the teachings of the method of the invention.

Describing now the drawings, it is to be understood that only enough of the gas turbine plant has been shown to enable those skilled in the art to readily understand the underlying principles and concepts of the present invention. The illustrated gas turbine plant or installation will be seen to comprise, by way of example, essentially two partial turbines, namely a low pressure section or portion 8 and a high pressure section or portion 6, each of which has operatively associated therewith a respective combustion chamber 9 and 5 mounted directly at the turbine housing 23. The not particularly referenced low pressure and high pressure buckets or blading of the turbine are seated upon a common shaft 14.

Reference character 1 designates a pre-heater which is operatively associated with the gas turbine installation. At the infeed location 2 of the pre-heater 1 there is supplied thereto a work medium, in the present case assumed to be air, for instance from a not particularly shown air storage, the infed air having a relatively low temperature. This air is heated in the pre-heater 1 and delivered by means of an air infeed line or conduit 3 to the high pressure housing 4 of the gas turbine i.e., the housing 4 of the high pressure section, where it flushes the inner wall of such housing 4 before it arrives at the high pressure-combustion chamber 5 where it is heated to the inlet temperature of the high pressure section or turbine 6. After flowing through the high pressure section or turbine 6 the work medium enters the housing 7 of the low pressure section or turbine 8. At this location the work medium flushes the inner surface or wall of the housing 7 before it arrives at the low pressure-combustion chamber 9. The exhaust gases are conducted in the direction of the arrows from the exhaust gas exit or outlet 10 back to the pre-heater 1 where they heat up the intake air flowing through the tubing 11 or the like. Following the heat exchange action within the pre-heater 1 the exhaust gases leave pre-heater 1 at the outlet location 12. For the quantative regulation of the work medium there is provided a standard regulating or control element 13 in the infeed line leading to the high pressure section or turbine 6. Since the high pressure turbine 6 and the low pressure turbine 8 are arranged upon the common shaft 14, with the result that the axial thrust forces of both turbine blading or buckets add, there is provided a compensation or equalization piston 15 at the shaft 14.

With the benefit of the foregoing description of the turbine plant of the invention there will now be described its mode of operation:

For the full load operating point of the gas turbine installation or plant, the temperatures of the work medium are chosen such that they are the same both at the high pressure housing 4 and also at the housing 7 of the low pressure turbine 8, i.e., both housings 4 and 7 are heated to the same temperature. Each load change of the gas turbine plant is primarily regulated by means of the regulation element 13 and secondarily by changing the exit temperatures from the high pressure-combustion chamber 5 and the low pressure-combustion chamber 9. During, for instance a load reduction of the gas turbine installation to about 50% of the rated load the regulation element 13 is partially closed, so that the throughput is reduced to about 55% to 60% of the rated throughput. Consequently, the pressure conditions at the low pressure turbine 8 are likewise reduced to approximately one-half, whereas the pressure conditions of the high pressure turbine 6 remain approximately the same. The regulation of the fuel infeed to the high pressure-combustion chamber 5 is accomplished in such a manner that also at half load the temperature of the gas after expansion in the high pressure turbine 6, upon entering the housing 7 of the low pressure turbine 8, is the same as during full load. By regulating the fuel infeed to the low pressure-combustion chamber 9 it is possible to set the exhaust gas temperature of the low pressure turbine 8 such that the inlet temperature of the work medium to the high pressure housing 4 is the same as during full load. In this way there is ensured that the temperatures of the high pressure housing 4 and the low pressure housing 7 remain the same in relation to the full load operating mode, so that there are avoided in a most advantageous manner the formation of additional thermal stresses at the housings 4, 7.

Figure 2:
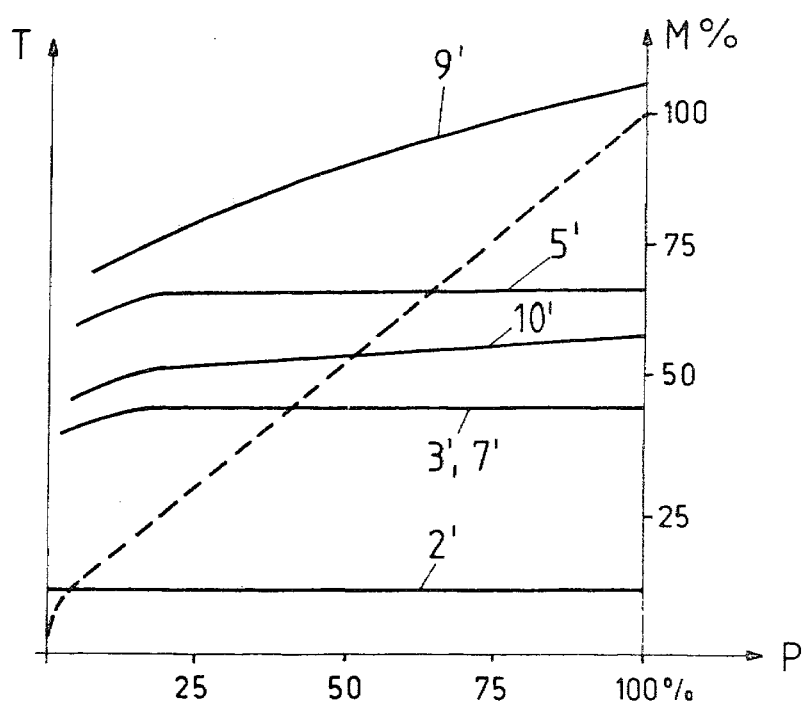
FIG. 2 is a diagram showing different graphs and plotting the mass throughput and temperature course as a function of load.

From the graphs shown in FIG. 2 there will be recognized the basic course of the temperatures at the gas turbine plant as a function of load. The temperature is illustrated with full lines, the mass flow with phantom lines. Along the abscissa there is plotted the load, along the one ordinate, at the left, the temperature and along the other ordinate the mass flow. The curve 2' represents the inlet temperature of the cool air entering the pre-heater 1. The curve 3' designates the inlet temperature of the combustion air to the high pressure housing 4 after pre-heating the same. In the combustion chamber 5, shown in FIG. 1, the combustion air is heated to the temperature 5' and thereafter is expanded in the high pressure turbine 6 to the temperature 7', which, according to the invention, is the same as the inlet temperature 3'. In the low pressure-combustion chamber 9 there is heated to the temperature 9' the air which already has partially been replaced with exhaust gases and expanded in the low pressure turbine 8 to the exit temperature 10'.

With partial load it is to be observed that upon reduction of the mass flow the exhaust gas temperature at exit 10 would increase if there were not undertaken any counter measures. Equally, during partial load there changes the coefficient of heat transmission in the pre-heater 1. From the showing of FIG. 2 it will be seen that, owing to the reduction of the pressure conditions in the low pressure turbine 8 at partial load the inlet temperature to the low pressure turbine 8 must be dropped in order to obtain approximately constant exit temperatures. The gas temperatures at the high pressure housing 4 and at the low pressure housing 7 can be maintained constant over a wide range. With the inventive regulation it is therefore possible to obtain an essentially constant housing wall temperature during partial load only by using a separate high pressure-combustion chamber.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. In a method of operating a gas turbine plant having a turbine incorporating a high-pressure section having a high-pressure housing and a low-pressure section having a low-pressure housing, each of which has operatively connected therewith a respective high-pressure combustion chamber and low-pressure combustion chamber, and wherein the combustion air is preheated in a pre-heater, the improvement comprising the steps of:

initially heating the combustion air in the pre-heater prior to entry thereof into the high-pressure combustion chamber;

flushing the inner walls of the housing of the high-pressure section of the turbine by means of the air which is pre-heated in the pre-heater before such air enters the high-pressure combustion chamber, in order to thereby heat-up such inner walls of the housing to a predetermined temperature;

expelling exhaust gases from the high-pressure section of the turbine into the low-pressure section; and flushing by means of said expelled exhaust gases the low-pressure housing of the turbine prior to entry of such exhaust gases into the low-pressure combustion chamber.

2. In a method of operating a gas turbine plant having a turbine incorporating a high-pressure section having a high-pressure housing and a low-pressure section having a low-pressure housing, each of which has operatively connected therewith a respective high-pressure combustion chamber and low-pressure combustion chamber, and wherein the combustion air is preheated in a pre-heater, the improvement comprising the steps of:

initially heating the combustion air in the pre-heater prior to entry thereof into the high-pressure combustion chamber;

flushing the inner walls of the housing of the high-pressure section of the turbine by means of the air which is pre-heated in the pre-heater before such air enters the high-pressure combustion chamber, in order to thereby heat-up such inner walls of the housing to a predetermined temperature;

expelling exhaust gases from the high-pressure section of the turbine into the low-pressure section;

flushing by means of said expelled exhaust gases the low-pressure housing of the turbine prior to entry of such exhaust gases into the low-pressure combustion chamber;

selecting the outlet temperature of the exhaust gases from the high-pressure section and entering the low-pressure housing such that such outlet temperature substantially corresponds to the air temperature in the high-pressure housing;

during partial load of the turbine maintaining substantially constant the gas temperature following the high-pressure combustion chamber; and regulating in the presence of varying load by means of a regulating element the quantity of infed combustion air and the exhaust gas temperature before and after the low-pressure section such that throughout a further load range the air temperature in the high-pressure housing and the exhaust temperature in the low-pressure housing remain essentially at the same magnitude and analogous to full-load turbine output.

* * * * *